(12) United States Patent
Block et al.

(10) Patent No.: US 11,165,766 B2
(45) Date of Patent: Nov. 2, 2021

(54) IMPLEMENTING AUTHENTICATION PROTOCOL FOR MERGING MULTIPLE SERVER NODES WITH TRUSTED PLATFORM MODULES UTILIZING PROVISIONED NODE CERTIFICATES TO SUPPORT CONCURRENT NODE ADD AND REMOVE

(71) Applicant: International Business Machines Corporation, Armonk, NY (US)

(72) Inventors: Timothy R. Block, Rochester, MN (US); Elaine R. Palmer, Hanover, NH (US); Kenneth A. Goldman, Norwalk, CT (US); William E. Hall, Clinton, UT (US); Hugo M. Krawczyk, Tarrytown, NY (US); David D. Sanner, Rochester, MN (US); Christopher J. Engel, Rochester, MN (US); Peter A. Sandon, Essex Junction, VT (US); Alwood P. Williams, III, Spicewood, TX (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 16/106,069

(22) Filed: Aug. 21, 2018

(65) Prior Publication Data

US 2020/0067912 A1 Feb. 27, 2020

(51) Int. Cl.
*H04L 29/06* (2006.01)
*H04L 9/08* (2006.01)
(Continued)

(52) U.S. Cl.
CPC ........ *H04L 63/0823* (2013.01); *G06F 9/4416* (2013.01); *G06F 9/44505* (2013.01);
(Continued)

(58) Field of Classification Search
CPC ....... H04L 9/3263; H04L 63/20; H04L 9/085; H04L 9/0897; H04L 63/0823;
(Continued)

(56) References Cited

U.S. PATENT DOCUMENTS

| 5,371,852 A | 12/1994 | Attanasio et al. |
| 7,146,497 B2 | 12/2006 | Almeida et al. |

(Continued)

FOREIGN PATENT DOCUMENTS

WO WO2015147986 A1 10/2015

OTHER PUBLICATIONS

Fongen et al., "Attested Genuineness in Service Oriented Environments", The Third International Conference on Digital Information Processing and Communications, 2013, pp. 8-17.
(Continued)

*Primary Examiner* — Baotran N To
(74) *Attorney, Agent, or Firm* — Nathan M. Rau

(57) ABSTRACT

A method and computer system for implementing authentication protocol for merging multiple server nodes with trusted platform modules (TPMs) utilizing provisioned node certificates to support concurrent node add and node remove. Each of the multiple server nodes boots an instance of enablement level firmware and extended to a trusted platform module (TPM) on each node as the server nodes are powered up. A hardware secure channel is established between the server nodes for firmware message passing as part of physical configuration of the server nodes to be merged. A shared secret is securely exchanged via the hardware secure channel between the server nodes establishing an initial authentication value shared among all server nodes. All server nodes confirm common security configuration settings and exchange TPM log and platform configuration register (PCR) data to establish common his-
(Continued)

tory for future attestation requirements, enabling dynamic changing the server nodes and concurrently adding and removing nodes.

20 Claims, 17 Drawing Sheets

(51) Int. Cl.
G06F 9/455 (2018.01)
G06F 9/4401 (2018.01)
G06F 9/445 (2018.01)

(52) U.S. Cl.
CPC .......... *G06F 9/45558* (2013.01); *H04L 9/085* (2013.01); *G06F 2009/45595* (2013.01)

(58) Field of Classification Search
CPC ......... H04L 9/3215; G06F 2009/45595; G06F 9/45558; G06F 9/4416; G06F 21/85; G06F 21/74; G06F 9/44505; G06F 21/575
See application file for complete search history.

(56) References Cited

U.S. PATENT DOCUMENTS

| | | | |
|---|---|---|---|
| 7,779,244 B2 | 8/2010 | Zimmer et al. | |
| 8,589,672 B2 | 11/2013 | Dasari et al. | |
| 8,694,762 B2 | 4/2014 | Ekberg | |
| 9,223,982 B2 | 12/2015 | Adams | |
| 9,413,765 B2 | 8/2016 | Swanson | |
| 9,448,615 B2 | 9/2016 | Larson | |
| 9,448,950 B2 | 9/2016 | Scarlata | |
| 9,465,943 B2 | 10/2016 | Paris | |
| 9,582,351 B2 | 2/2017 | Boecker | |
| 9,608,825 B2 | 3/2017 | Sarangdhar et al. | |
| 9,633,196 B2 | 4/2017 | Lin | |
| 9,720,704 B2 | 8/2017 | Reick | |
| 9,766,900 B2 | 9/2017 | Gundam | |
| 9,767,289 B2 | 9/2017 | Martinez | |
| 9,857,998 B2 | 1/2018 | Lobo | |
| 9,916,476 B2 | 3/2018 | Dasari | |
| 10,885,197 B2 | 1/2021 | Block | |
| 2005/0071625 A1 | 3/2005 | Almeida | |
| 2007/0101138 A1 | 5/2007 | Camenisch | |
| 2008/0162873 A1 | 7/2008 | Zimmer | |
| 2009/0007104 A1 | 1/2009 | Zimmer et al. | |
| 2010/0082984 A1* | 4/2010 | Ellison | H04L 9/3236 713/170 |
| 2010/0125731 A1* | 5/2010 | Dasari | G06F 9/5061 713/155 |
| 2011/0302425 A1 | 12/2011 | Saripalli | |
| 2012/0030730 A1 | 2/2012 | Smith | |
| 2012/0163589 A1 | 6/2012 | Johnson et al. | |
| 2015/0235263 A1 | 8/2015 | Bodz et al. | |
| 2015/0281237 A1 | 10/2015 | Swanson | |
| 2015/0294116 A1 | 10/2015 | Gundam et al. | |
| 2015/0294119 A1* | 10/2015 | Gundam | G06F 21/629 713/2 |
| 2016/0127193 A1 | 5/2016 | Deniaud | |
| 2016/0142212 A1 | 5/2016 | Sarangdhar | |
| 2016/0147675 A1 | 5/2016 | Lin | |
| 2016/0306975 A1 | 10/2016 | Schmidt | |
| 2016/0323284 A1 | 11/2016 | Swanson | |
| 2017/0019251 A1 | 1/2017 | Jain | |
| 2017/0041147 A1* | 2/2017 | Krahn | H04L 9/3268 |
| 2017/0054707 A1 | 2/2017 | Leicher | |
| 2017/0061163 A1 | 3/2017 | Dasari | |
| 2017/0187799 A1 | 6/2017 | Pogorelik | |
| 2017/0302459 A1 | 10/2017 | Fenner | |
| 2017/0318056 A1 | 11/2017 | Georges | |
| 2018/0091312 A1 | 3/2018 | Thom | |
| 2018/0246732 A1 | 8/2018 | Puri | |
| 2019/0138294 A1 | 5/2019 | Smith | |
| 2019/0312851 A1 | 10/2019 | Campagna | |
| 2019/0332391 A1 | 10/2019 | Ndu | |
| 2020/0099536 A1 | 3/2020 | Block | |

OTHER PUBLICATIONS

Heller et al., "OpenPOWER secure and trusted boot, Part 1: Using trusted boot on IBM OpenPOWER servers", 13 pages, downloaded from <https://www.ibm.com/developerworks/library/l-trusted-boot-openPOWER-trs/l-trusted-boot-openPOWER-trs-pdf.pdf> dated Aug. 28, 2018.

List of IBM Patents or Patent Applications Treated as Related, signed Jun. 10, 2021.

Nguyen et al., "Survey on secure communication protocols for the Internet of Things", Ad Hoc Networks, vol. 32, 2015, pp. 17-31.

Nguyen, K. T., Laurent, M., & Oualha, N. (2015). Survey on secure communication protocols for the Internet of Things. Ad Hoc Networks, 32, pp. 17-31.

\* cited by examiner

IMPLEMENTING AUTHENTICATION PROTOCOL FOR MERGING MULTIPLE SERVER NODES WITH TRUSTED PLATFORM MODULES UTILIZING PROVISIONED NODE CERTIFICATES TO SUPPORT CONCURRENT NODE ADD AND REMOVE

FIELD OF THE INVENTION

The present invention relates generally to the data processing field, and more particularly, relates to a method and computer system for implementing authentication protocol for merging multiple server nodes with trusted platform modules (TPMs) utilizing provisioned node certificates to support concurrent node add and node remove.

DESCRIPTION OF THE RELATED ART

A trusted platform module (TPM) is a processor chip that implements a specification published by the Trusted Computing Group (TCG) detailing a secure crypto-processor that can store cryptographic keys that protect information. A trusted platform module offers a number of capabilities, including remote attestation which creates a nearly unforgeable hash of the hardware and software configuration. If it is detected that a hash has changed, then this indicates that the hardware or software has been modified and trust may be lost.

Many server architectures make use of a Trusted Platform Module (TPM) to establish a root of trust chain for firmware which is anchored in hardware. The TPM is a small cryptographic engine which provides a basic building block for the creation of a firmware root of trust, the architecture and implementation of which come from the Trusted Computing Group's (TCG) TPM specification.

A TPM chip is typically installed on a motherboard in some fashion along with processors and memory to comprise a single server node. For enterprise class servers, multiple TPMs may be installed as part of a single node architecture to provide Reliability and Serviceability (RAS) support to prevent single points of failure.

For example, the merging of multiple nodes for an enterprise server is done to provide a single server view with enhanced processor and memory capabilities to meet high end demands. The merging of nodes is typically done under the control of a service processor. The service processor is typically treated as being in a separate security domain from the security domain of the host system with its processors, memory and TPMs.

The advent of a service processor controlled node merge operation where the service processor is either untrusted or, at least, not trusted to the same level as the host security domain leaves the merge process vulnerable to certain security threats. Threats that may need to be considered for the multi-node server environment include spoofing (node impersonation if lacking authentication of nodes), tampering (integrity of node protocol messages thereby exposing threat of relay and replay attacks by an evil or exploited service processor or exploited hypervisor), information disclosure, denial of service, multiple master attacks, code and TPM log integrity issues.

SUMMARY OF THE INVENTION

Principal aspects of the present invention are to provide a method and computer system for implementing authentication protocol for merging multiple server nodes with trusted platform modules (TPMs) utilizing provisioned node certificates to support concurrent node add and remove. Other important aspects of the present invention are to provide such method, and computer system substantially without negative effects and that overcome some of the disadvantages of prior art arrangements.

In brief, a method and computer system for implementing authentication protocol for merging multiple server nodes with trusted platform modules (TPMs) utilizing provisioned node certificates to support concurrent node add and node remove. Each of the multiple server nodes boots an instance of enablement level firmware and extended to a trusted platform module (TPM) on each node as the server nodes are powered up. A hardware secure channel is established between the server nodes for firmware message passing as part of physical configuration of the server nodes to be merged. A shared secret is securely exchanged via the hardware secure channel between the server nodes establishing an initial authentication value shared among all server nodes. All server nodes confirm common security configuration settings and exchange TPM log and platform configuration register (PCR) data to establish common history for future attestation requirements, enabling dynamic changing the server nodes and concurrently adding and removing nodes.

In accordance with features of the invention, the authentication protocol is used with a single or multiple TPMs per server node.

In accordance with features of the invention, the hardware secure channel is a low bandwidth hardware secure channel. Optionally, the hardware secure channel is a higher bandwidth hardware secure channel having sufficient bandwidth to handle all protocol messages between the server nodes as trusted.

In accordance with features of the invention, a service processor open channel optionally is used to send additional protocol messages after the multiple server nodes boot, which is not trusted to the same level of trust as the hardware secure channel.

In accordance with features of the invention, a master node of the multiple server nodes can be dynamically changed after physical configuration of the server nodes. A master server node with a master TPM can fail or be removed and the concurrence requirement dictates that an existing slave TPM on a slave node is required to have full system history covered in its logs and protected in its Platform Configuration registers (PCRs) in such a way as to enable continued validation of system trust without requiring another system initial program load (IPL).

In accordance with features of the invention, dynamic changing the server nodes and concurrently adding and removing nodes is provided without requiring system IPL to restore operation.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention provides an effective method and computer system for implementing authentication protocol for merging multiple server nodes with trusted platform modules (TPMs) utilizing provisioned node certificates to support concurrent, hot node add and remove in accordance with preferred embodiments. In the multiple server nodes, each server node boots an instance of enablement level firmware on each node, called Host boot (HB) as the nodes are powered up. Some form of secure channel is required with a hard wired secure low bandwidth channel established between the nodes sufficient to exchange an initial shared secret. The authentication protocol then sends all additional protocol messages via an open service processor (SP) channel which is not trusted to the same level of trust as that of the host processors. Alternatively, the secure channel could have sufficient bandwidth to handle all of this traffic as trusted. Optionally, a type II hypervisor (HYP) is used supporting add and remove nodes referred to in the authentication protocol as Concurrent Hot Add/Remove (CHARM).

Figure 1A:
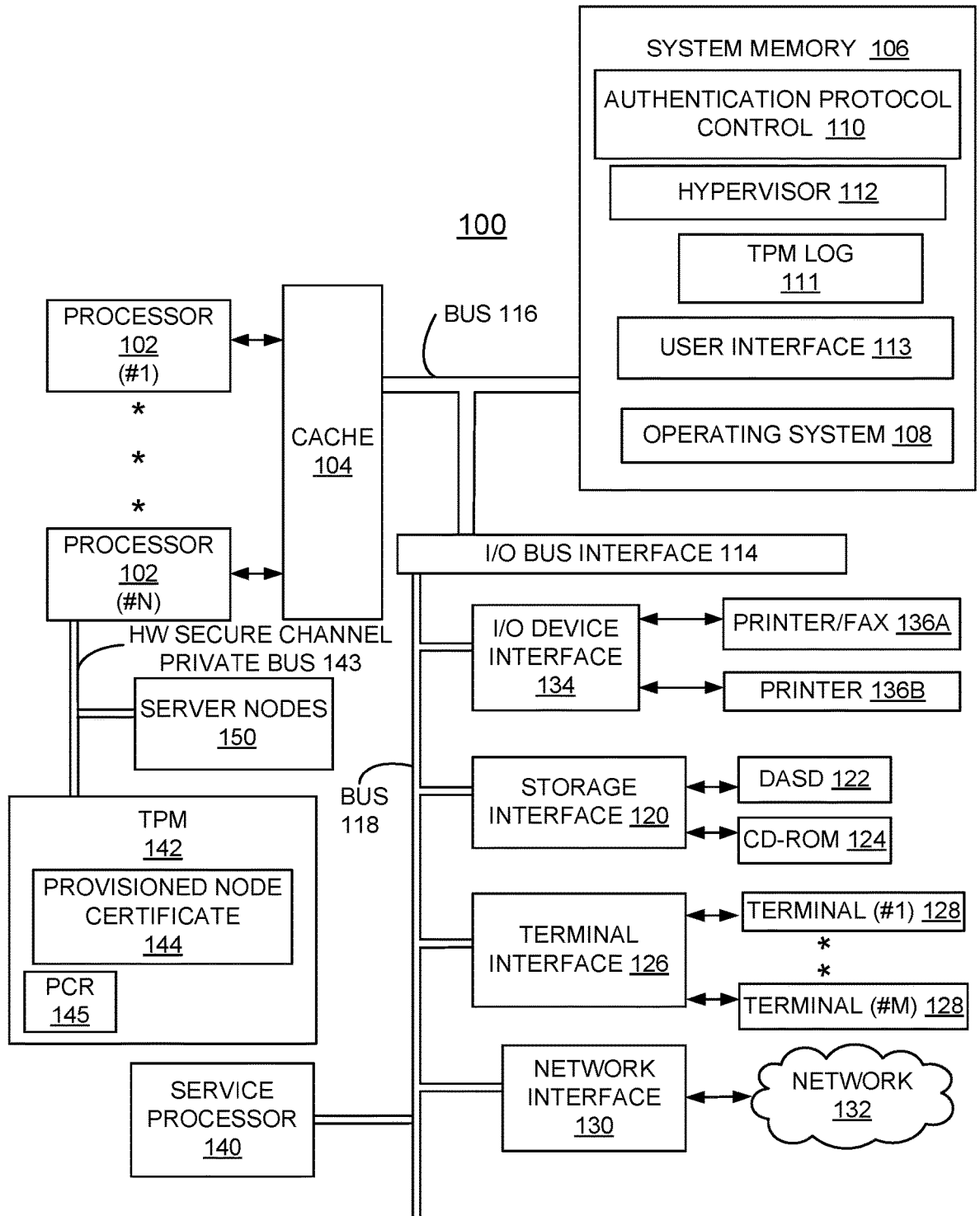
FIGS. 1A and 1B are block diagrams illustrating an example computer system for implementing authentication protocol for merging multiple server nodes with trusted platform modules (TPMs) utilizing provisioned node certificates to support concurrent node add and remove in accordance with preferred embodiments.
Figure 1B:
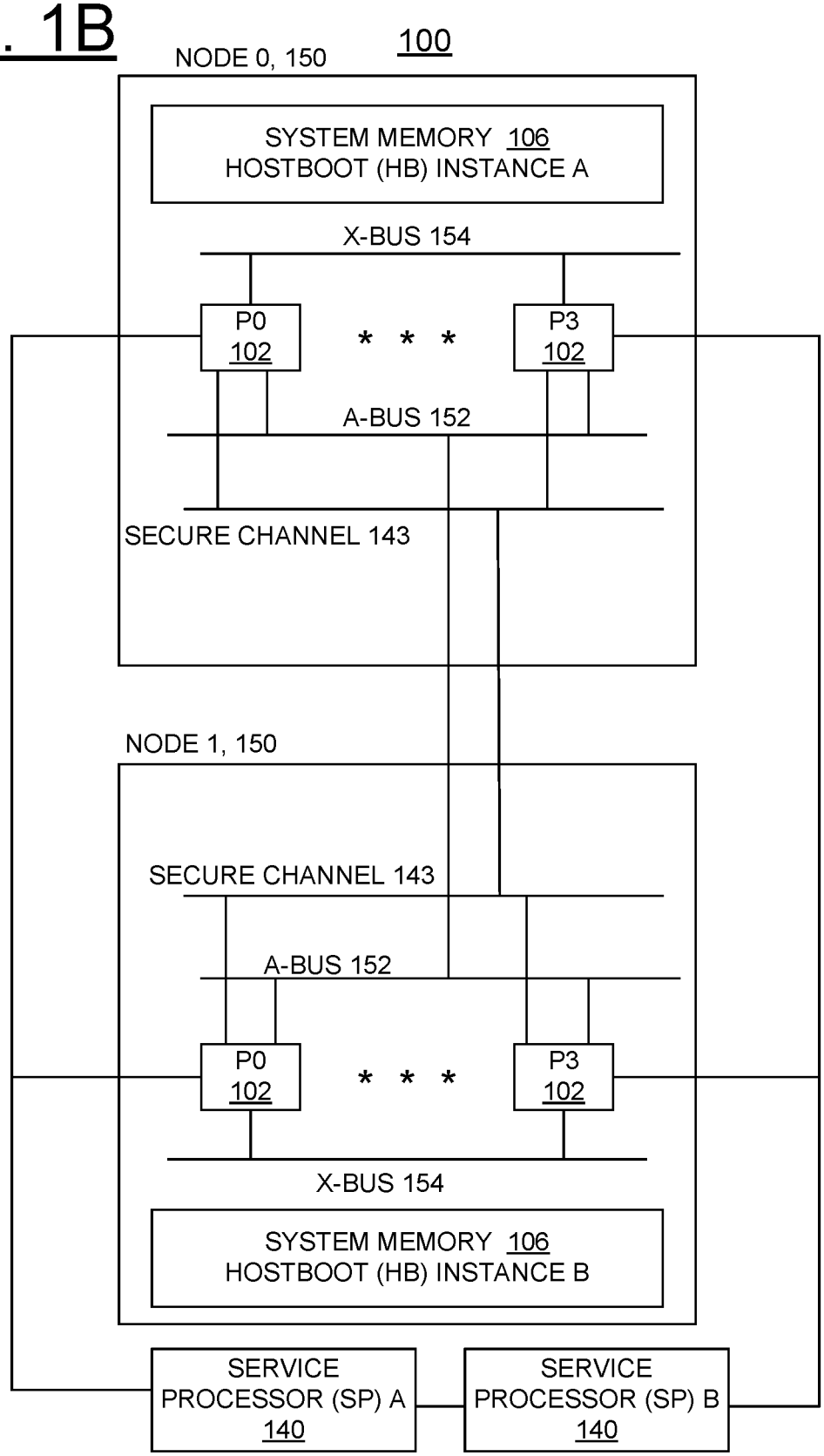

With reference now to the drawings, in FIGS. 1A and 1B, there is shown an example computer system generally designated by the reference character 100 for implementing authentication protocol for merging multiple server nodes with trusted platform modules (TPMs) utilizing provisioned node certificates to support concurrent node add and remove in accordance with preferred embodiments. Computer system 100 illustrates an example server computer system arranged in a cluster with multiple server computer systems or server nodes in accordance with preferred embodiments.

Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a system memory 106, an operating system 108, an authentication protocol control 110, a trusted platform module (TPM) log 111, and a hypervisor 112 in accordance with an embodiment of the invention, and a user interface 113. Hypervisor 112 optionally includes a type II hypervisor installed on top of the operating system 108. System memory 106 is a random-access semiconductor memory for storing data, including programs. System memory 106 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, system memory 106 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, and a I/O device interface 134 coupled to I/O devices, such as a first printer/fax 136A, and a second printer 136B.

Computer system 100 includes a service processor 140, a trusted platform module (TPM) 142 with a dedicated bus or hardware (HW) secure channel bus 143 connecting the TPM 142 to selected processors 102. TPM 142 includes a provisioned node certificate 144 to support concurrent node add and remove in multiple server nodes in accordance with preferred embodiments. TPM 142 includes platform configuration registers (PCRs) 145 with the associated TPM log 111 in the system memory 106 that is storing exchanged log/PCR information where information is appropriately committed to local TPM PCRs and local TPM logs in the member server nodes to establish common history for future attestation requirements in accordance with preferred embodiments. The authentication protocol can be arranged for use with a single or multiple TPMs 142 per node.

Computer system 100 includes the hardware (HW) secure channel bus 143 connecting multiple server nodes 150. Each server node 150 includes a server system such as the illustrated computer system 100. The authentication protocol makes use of a low bandwidth hardware secure channel 143 established between nodes 150 for firmware message passing as part of physical configuration of the multiple nodes 150 to be merged. The secure channel bus 143 allows a shared secret to be securely exchanged between nodes 150 in accordance with preferred embodiments.

In accordance with features of the invention, optionally, the hardware secure channel bus 143 includes a higher bandwidth hardware secure channel having sufficient bandwidth to handle all protocol messages between the server nodes as trusted. An open channel of service processor 140 optionally is used to send additional protocol messages after the multiple server nodes boot, which is not trusted to the same level of trust as the hardware secure channel bus 143.

In accordance with features of the invention, the protocol defined here then optionally assumes a higher bandwidth untrusted communications path, for example, via a messaging path provided by an untrusted service processor 140 for subsequent authenticated fully meshed messaging between all master and slave node HB FW with associated TPMs using the shared secret previously exchanged. This messaging results in a trusted, verifiable information exchange.

In accordance with features of the invention, the verification of all messages received by all nodes leads to a protocol round to establish an agreed upon collection of nodes to be allowed into the single system image (cluster). All nodes in the collection have established knowledge of the shared secret and have confirmed common security configuration settings as necessary, and have exchanged necessary log and PCR data to establish common history for future attestation requirements.

In accordance with features of the invention, agreed upon membership leads to a commit cycle whereby previously exchanged log and PCR information is appropriately committed to local TPM PCRs 145 and local TPM logs 111 in the member nodes. This then becomes trusted attestable information independent of which server node is master and which TPM is master on the subject master node in a dynamically changing membership. Note that all TPM's PCRs will not match each other but will be verifiable against their respective TPM logs.

In accordance with features of the invention, by addressing the exchange of FW IPL history, any TPM in the multi-node system can take on the role of the master TPM and provide full attestable history of the FW run on that system despite nodes being added or removed from a running system concurrently, in other words, with no system IPL required.

I/O bus interface 114 communicates with multiple I/O interface units 120, 126, 130, and 134, which are also known as I/O processors (IOPs) or I/O adapters (IOAs), through system I/O bus 118. System I/O bus 118 is, for example, an industry standard PCI bus, or other appropriate bus technology.

Computer system 100 may be, for example, an IBM® eServer™ System P® computer system, running the Advanced Interactive Executive (AIX®) operating system or the LINUX® operating system.

Computer system 100 is shown in simplified form sufficient for understanding the present invention. It should be understood that the present invention is not limited to the illustrated arrangement of computer system 100.

Referring to FIG. 1B, there is shown a high level diagram illustrating multiple nodes, Node 0, 150 and Node 1, 150 interconnected with A-bus 152 and secure channels 143 and individual instances of hostboot (HB) A, B in respective system memory 106. After IPL, the multiple nodes, Node 0, 150 and Node 1, 150 are combined with a single instance of PHYP loaded at the HRMOR specified offset in the now combined system memory space. Each of the Node 0, 150 and Node 1, 150 includes multiple processors P0-P03, 102, each connected to an X-bus 152, A-bus 152 and secure channels 143. Service processors A, 140, and service processor B, 140 are connected to the multiple processors P0-P03, 102, of the multiple nodes, Node 0, 150 and Node 1, 150.

Figure 2:
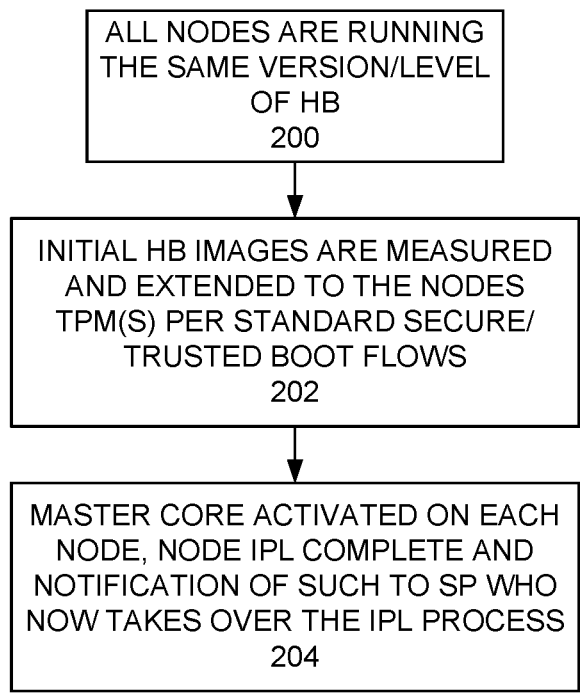
FIGS. 2, 3A, 3B, 3C, 3D, 3E, 3F, 3G, 4A, 4B, 4C, 4D, 5 and 6 together illustrates an example method for implementing authentication protocol for merging multiple server nodes with trusted platform modules (TPMs) utilizing provisioned node certificates to support concurrent node add and remove in accordance with preferred embodiments.

Referring to FIG. 2, there are shown system preconditions and authentication protocol trigger for implementing authentication protocol for merging multiple server nodes with trusted platform modules (TPMs) utilizing provisioned node certificates to support concurrent node add and remove in accordance with preferred embodiments. As indicated at a block 200, all nodes are running the same version/level of HB. As indicated at a block 202, initial HB images are measured and extended to the nodes TPMs per standard secure/trusted boot flows. As indicated at a block 204, a protocol trigger includes a master core activated on each node, with node IPL complete and notification of such to the service processor that now takes over the IPL process.

Figure 3A:
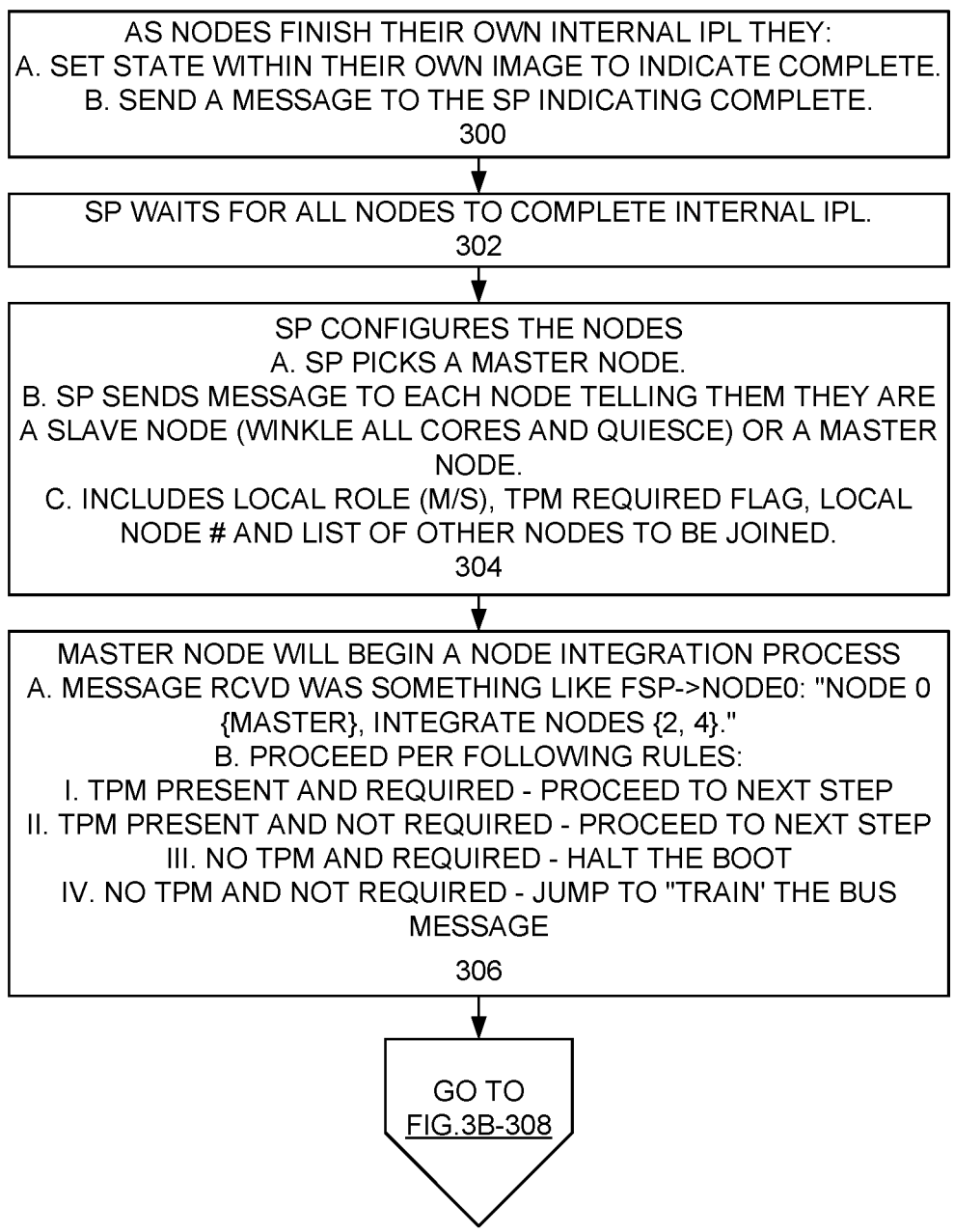

Referring to FIG. 3A, 3B, 3C, 3D, 3E, 3F, 3G, there are shown example operations of an example method of main good path protocol flow for implementing authentication protocol for merging multiple server nodes with trusted platform modules (TPMs) utilizing provisioned node certificates to support concurrent node add and remove in accordance with preferred embodiments. In FIG. 3A, as indicated at a block 300, first as nodes finish their own internal IPL the nodes: a. set state within their own image to indicate complete, and b. send a message to the service processor (SP) indicating complete. As indicated at a block 302, the service processor waits for all nodes to complete internal IPL. As indicated at a block 304, the service processor configures the nodes with a. service processor picks a master node, b. service processor sends message to each node telling them they are a slave node (winkle all cores and quiesce) or a master node, and c. includes local role (M/S), TPM required flag, local node # and list of other nodes to be joined. As indicated by a block 306, the master node will begin a node integration process with a. message rcvd was something like first SP->node0: "node 0 {master}, integrate nodes {2, 4 }." And then b. proceed per following rules including i. TPM present and required—proceed to next step;
ii. TPM present and not required—proceed to next step;
iii. no TPM and required—halt the boot;
iv. no TPM and not required—jump to "train' the bus message. Operations continue at a block 308 in FIG. 3B.

Figure 3B:
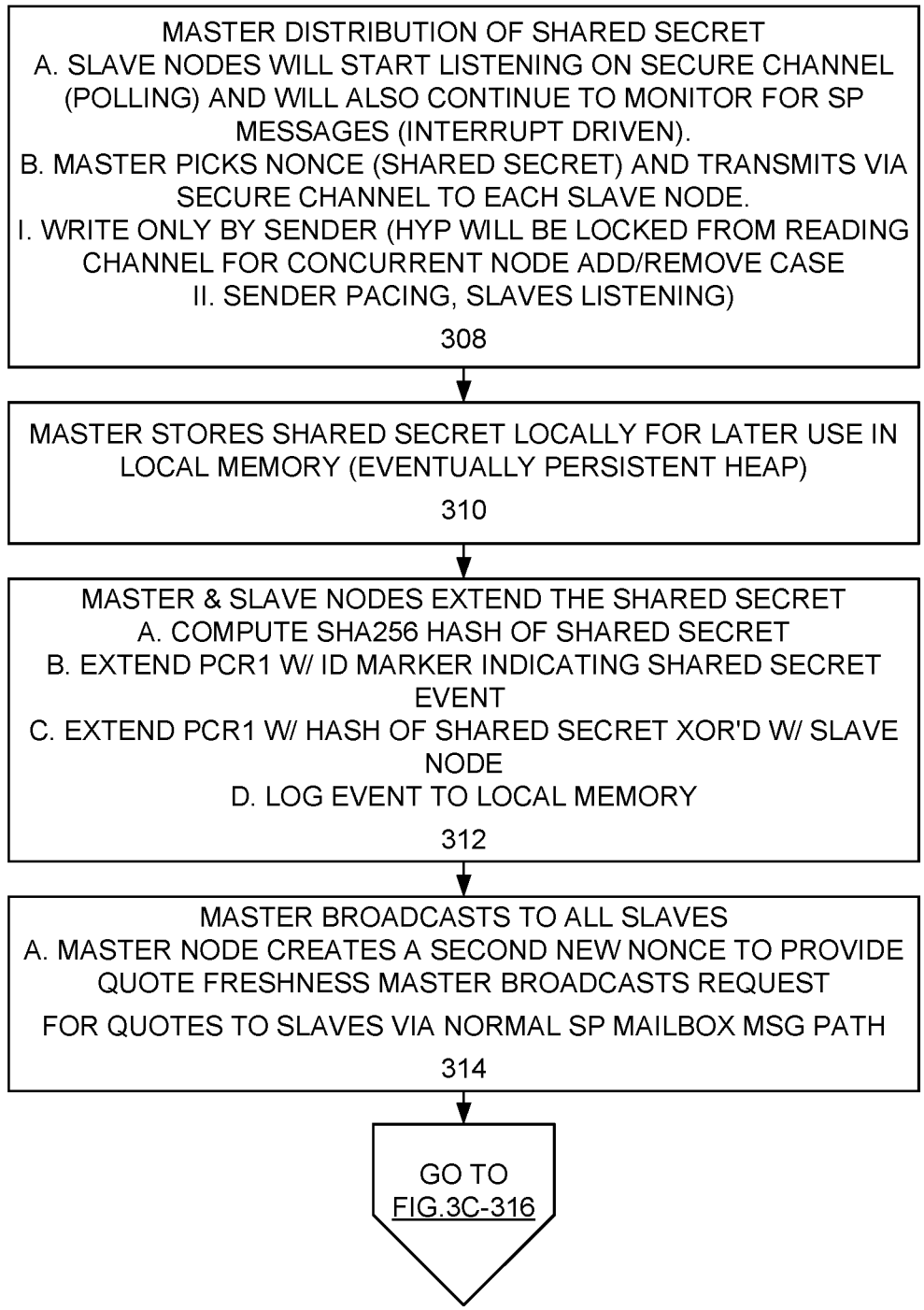

In FIG. 3B, as indicated at a block 308, the master distribution of shared secret includes: a. slave nodes will start listening on secure channel (polling) and will also continue to monitor for service processor messages (interrupt driven); b. master node picks nonce (shared secret) and transmits via secure channel to each slave node; i. write only by sender, hypervisor (HYP) will be locked from reading channel for CHARM case; and ii. sender pacing, slaves listening. As indicated at a block 310, the master node stores shared secret locally for later use in local memory (eventually persistent heap). As indicated at a block 312, the master and slave nodes extend the shared secret and a. compute SHA256 hash of shared secret; b. extend PCR1 with ID marker indicating shared secret event; c. extend PCR1 with hash of shared secret XORed with slave node; and d. log event to local memory. As indicated at a block 314, the master broadcasts to all slaves with a. master node creates a second new nonce to provide quote freshness; master broadcasts request for quotes to slaves via normal service processor mailbox message path. Operations continue at a block 316 in FIG. 3C.

Figure 3C:
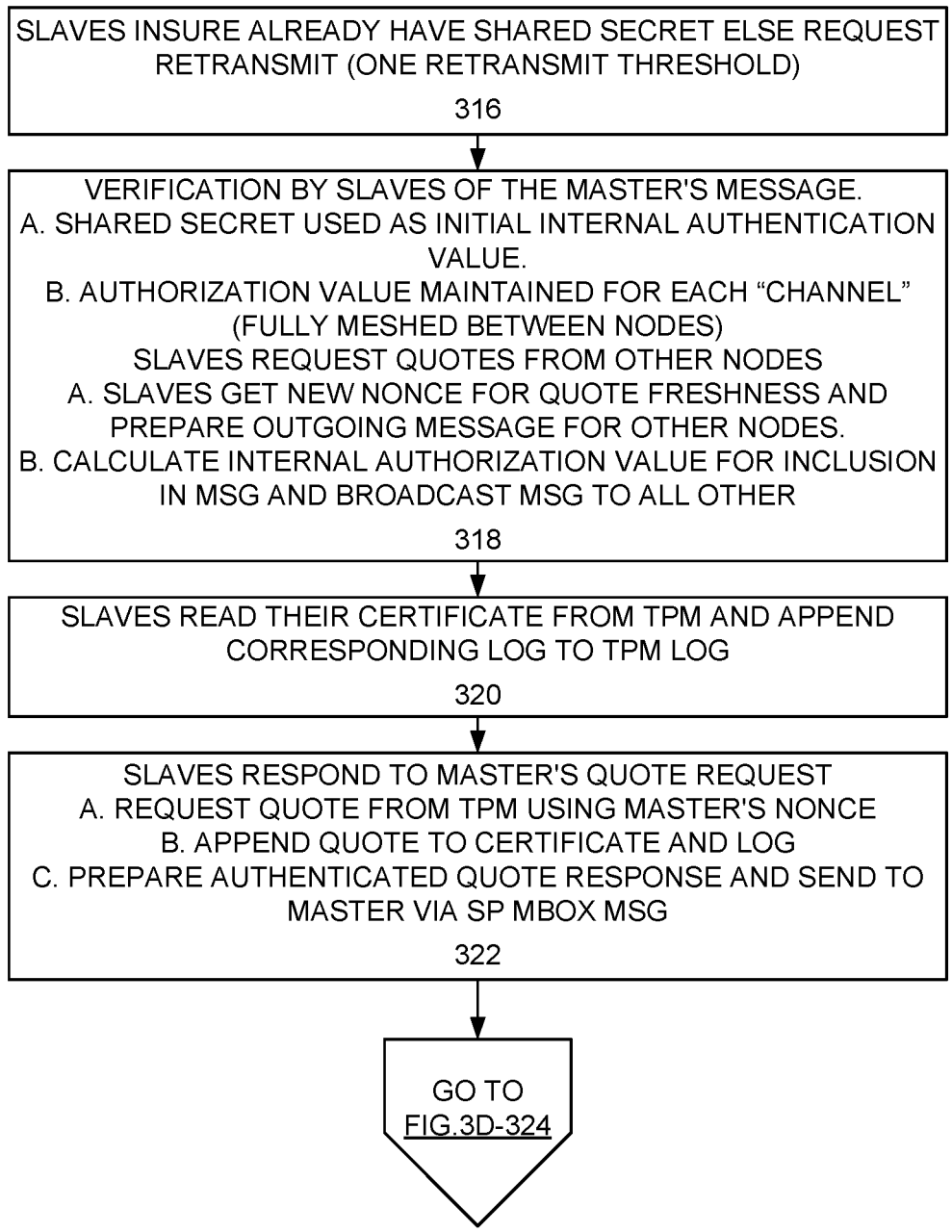

In FIG. 3C, as indicated at a block 316, slaves insure already have shared secret else request retransmit (one retransmit threshold). As indicated at a block 318, verification by slaves of the master's message with a. shared secret used as initial internal authentication value; and b. authorization value maintained for each channel, (fully meshed between nodes); next slaves request quotes from other nodes, and a. slaves get new nonce for quote freshness and prepare outgoing message for other nodes; and b. calculate internal authorization value for inclusion in message and broadcast message to all other. As indicated at a block 320, slaves read their certificate 144 from TPM and append corresponding log to TPM log 111. As indicated at a block 322, slaves respond to master's quote request with a. request quote from TPM using master's nonce; and b. append quote to certificate 144 and log 111; and c. prepare authenticated quote response and send to master via service processor mbox message. Operations continue at a block 324 in FIG. 3D.

Figure 3D:
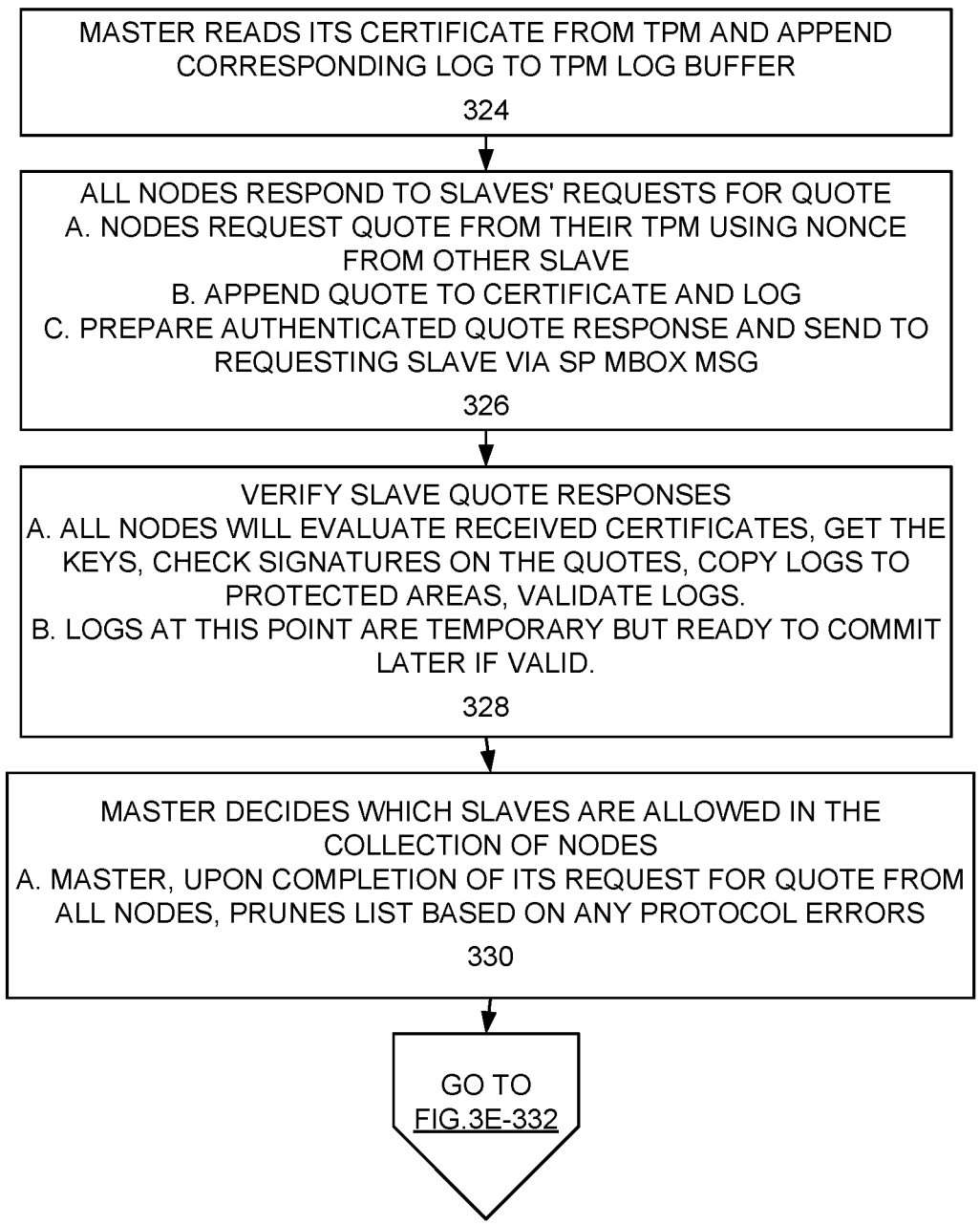

In FIG. 3D, as indicated at a block 324, master reads its certificate from TPM and appends corresponding log to TPM log buffer. As indicated at a block 326, all nodes respond to slaves' requests for quote with a. nodes request quote from their TPM using nonce from other slave; b. append quote to certificate and log; and c. prepare authenticated quote response and sends to requesting slave via service processor mbox message. As indicated at a block 328, slave quote responses are verified with a. all nodes evaluate received certificates, get the keys, check signatures on the quotes, copy logs to protected areas, validate logs; and b. logs at this point are temporary but ready to commit later if valid. As indicated at a block 330, master decides which slaves are allowed in the collection of nodes and a. master, upon completion of its request for quote from all nodes, prunes list based on any protocol errors. Operations continue at a block 332 in FIG. 3E.

Figure 3E:
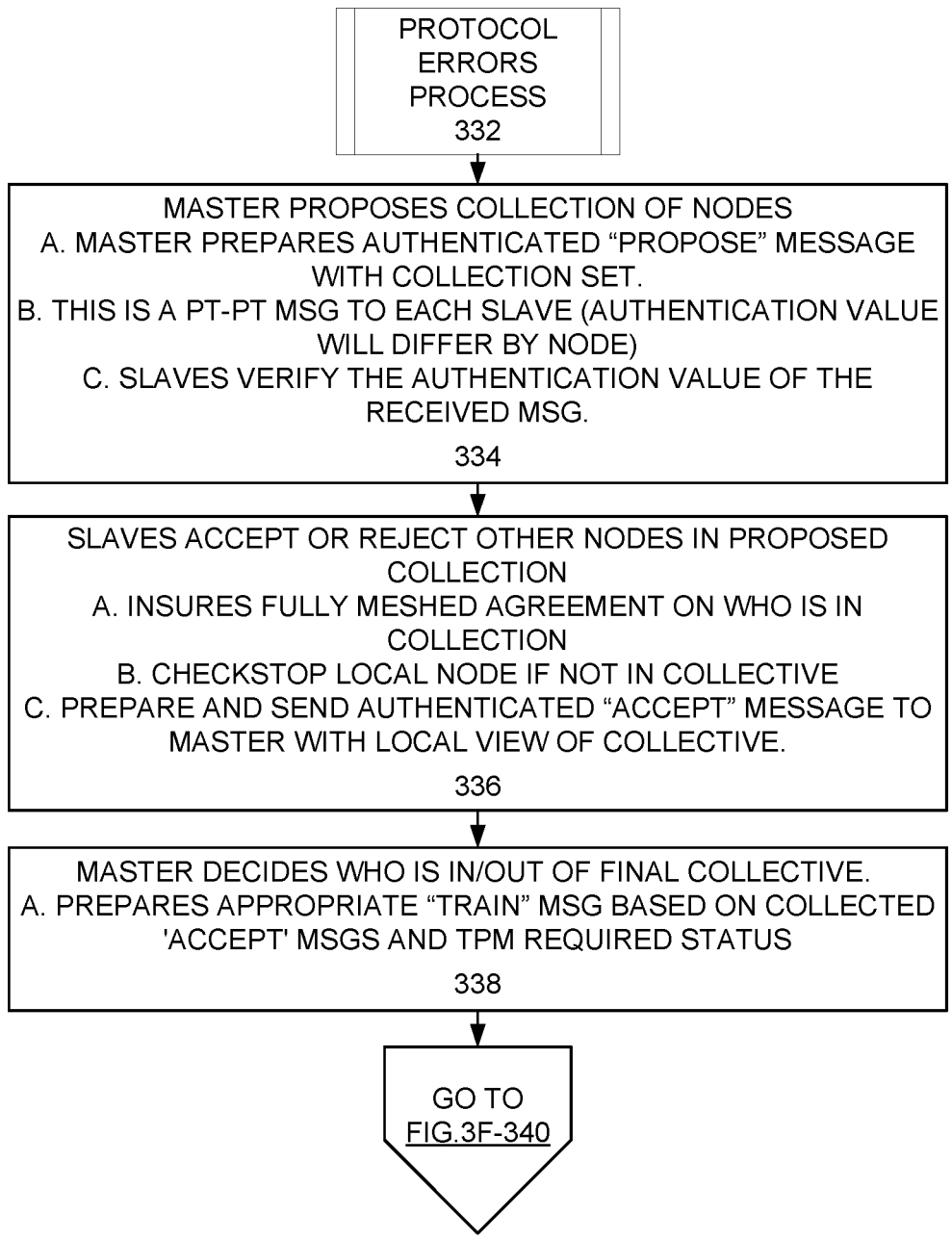

In FIG. 3E, at block 332, a protocol errors process begins. As indicated at a block 334, master proposes collection of nodes including a. master prepares authenticated propose message with collection set; b. this is a point-to-point message to each slave (authentication value will differ by node); and c. slaves verify the authentication value of the received message. As indicated at a block 336, slaves accept or reject other nodes in proposed collection with a. insures fully meshed agreement on who is in collection; b. checkstop local node if not in collective; and c. prepare and send authenticated accept message to master with local view of collective. As indicated at a block 338, master decides who is in/out of final collective; and a. prepares appropriate train message based on collected accept messages and TPM required status. Operations continue at a block 340 in FIG. 3F.

Figure 3F:
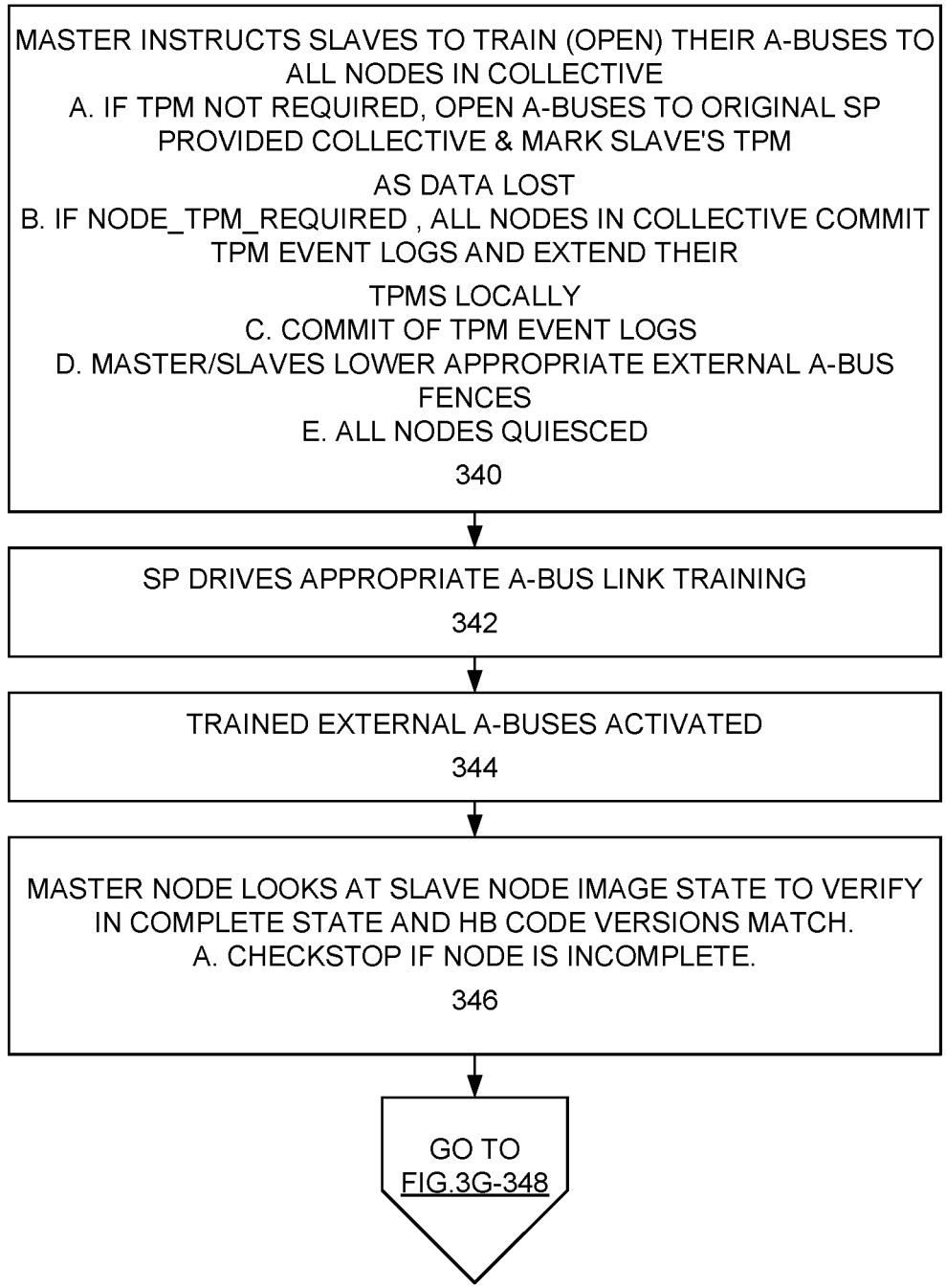

In FIG. 3F, as indicated at block 340, master instructs slaves to train (open) their A-buses to all nodes in collective with a. if TPM not required, open A-buses to original service processor provided collective and mark slave's TPM as data lost; b. if node_TPM_required, all nodes in collective commit TPM event logs and extend their TPMs locally; c. commit of TPM event logs; d. master/slaves lower appropriate external A-bus fences; and e. all nodes quiesced. As indicated at block 342, service processor drives appropriate A-bus link training. As indicated at block 344, trained external A-buses activated. As indicated at block 346, master node looks at slave node image state to verify in complete state and HB code versions match; and a. checkstop if node is incomplete. Operations continue at a block 348 in FIG. 3G.

Figure 3G:
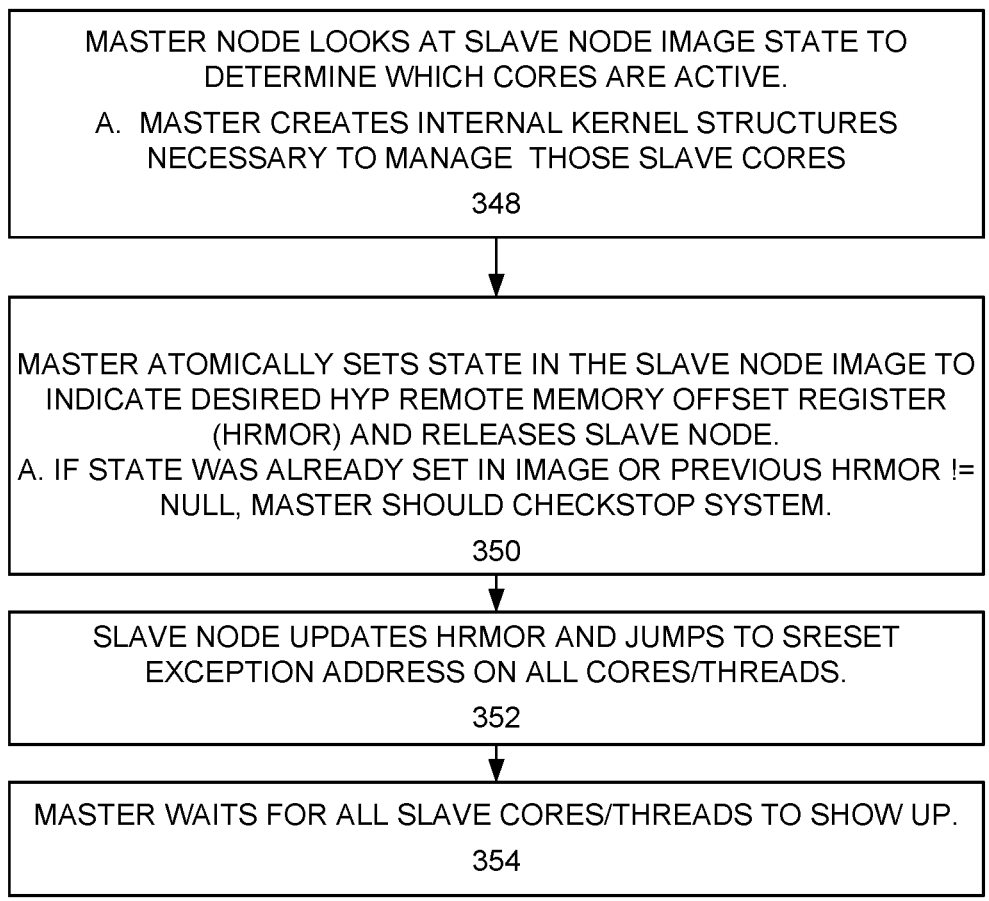

In FIG. 3G, as indicated at block 348, master node interrogates slave node image to determine which cores are active; and a. master creates internal kernel structures necessary to manage those slave cores. As indicated at block 350, master atomically sets state in the slave node image to indicate desired HYP remote memory offset register (HRMOR), i.e., a relocatable HYP, and releases slave node; and a. if state was already set in image or previous HRMOR !=null, master should checkstop. As indicated at block 352, slave node updates HRMOR and jumps to SRESET exception address on all cores/threads. As indicated at block 354, master waits for all slave cores/threads to show up.

Figure 4A:
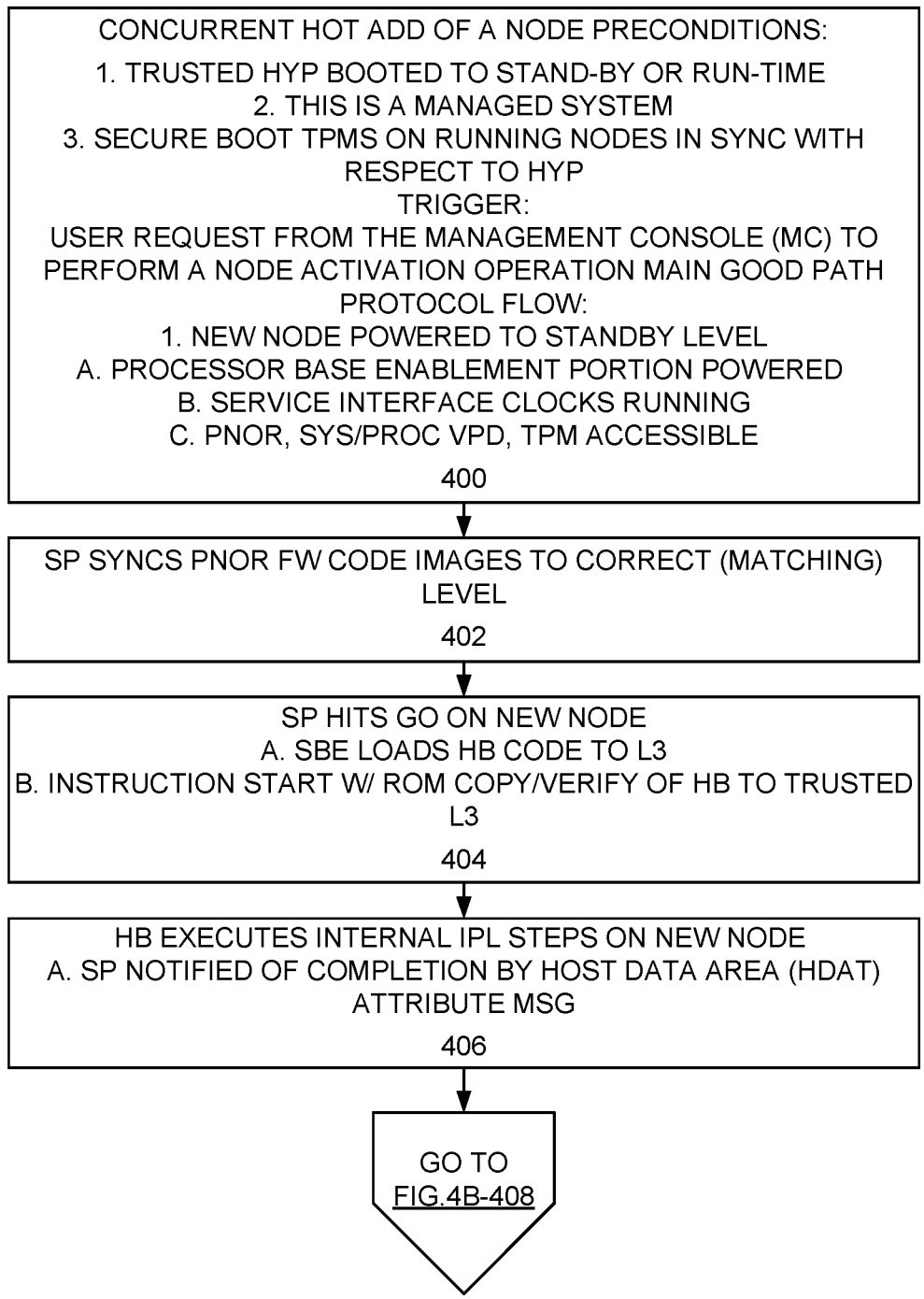

Referring to FIGS. 4A, 4B, 4C, and 4D, there are shown example operations of an example method to support concurrent node add and remove in accordance with preferred embodiments. In FIG. 4A, as shown starting at a block 400, concurrent hot add of a node preconditions: 1. trusted HYP booted to stand-by or run-time; 2. This is a managed system; and 3. secure boot TPMs on running nodes in sync with respect to HYP; Trigger: User request from the Management Console (MC) to perform a NODE activation; and Main good path protocol flow: 1. new node powered to standby level; a. processor base enablement portion powered; b. service interface clocks running; and c. PNOR, sys/proc VPD, TPM accessible. As indicated at a block 402, service processor syncs PNOR FW code images to correct (matching) level. As indicated at a block 404, service processor hits go on new node; a. SBE loads HB code to L3; b. instruction start with ROM copy/verify of HB to trusted L3. As indicated at a block 406, HB executes internal IPL steps on new node and a. service processor notified of completion by Host Data Area (HDAT) attribute message. Operations continue at a block 408 in FIG. 4B.

Figure 4B:
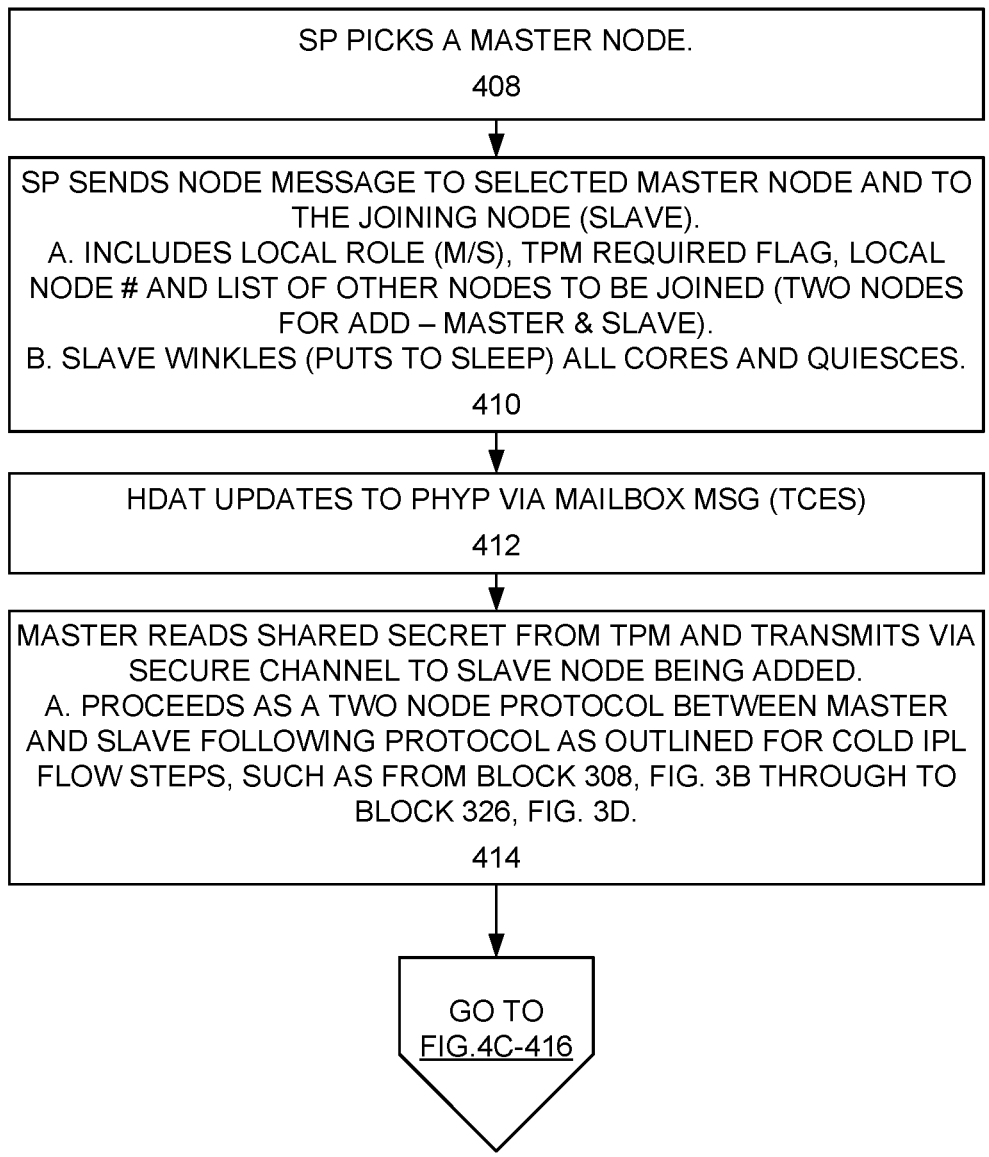

In FIG. 4B, as indicated at block 408, service processor picks a master node. As shown at a block 410, service processor sends node message to selected master node and to the joining node (slave) with a. includes local role (m/s), TPM required flag, local node # and list of other nodes to be joined (two nodes for add—master & slave). And b. slave winkles (puts to sleep) all cores and quiesces. As shown at a block 412, HDAT updates to hypervisor PHYP via mailbox message (TCEs). As shown at a block 414, master reads shared secret from TPM and transmits via secure channel to slave node being added with a. proceeds as a two node protocol between master and slave following protocol as outlined for cold IPL flow steps, such as, from block 308, FIG. 3B to block 326, FIG. 3D. Operations continue at a block 418 in FIG. 4C.

Figure 4C:
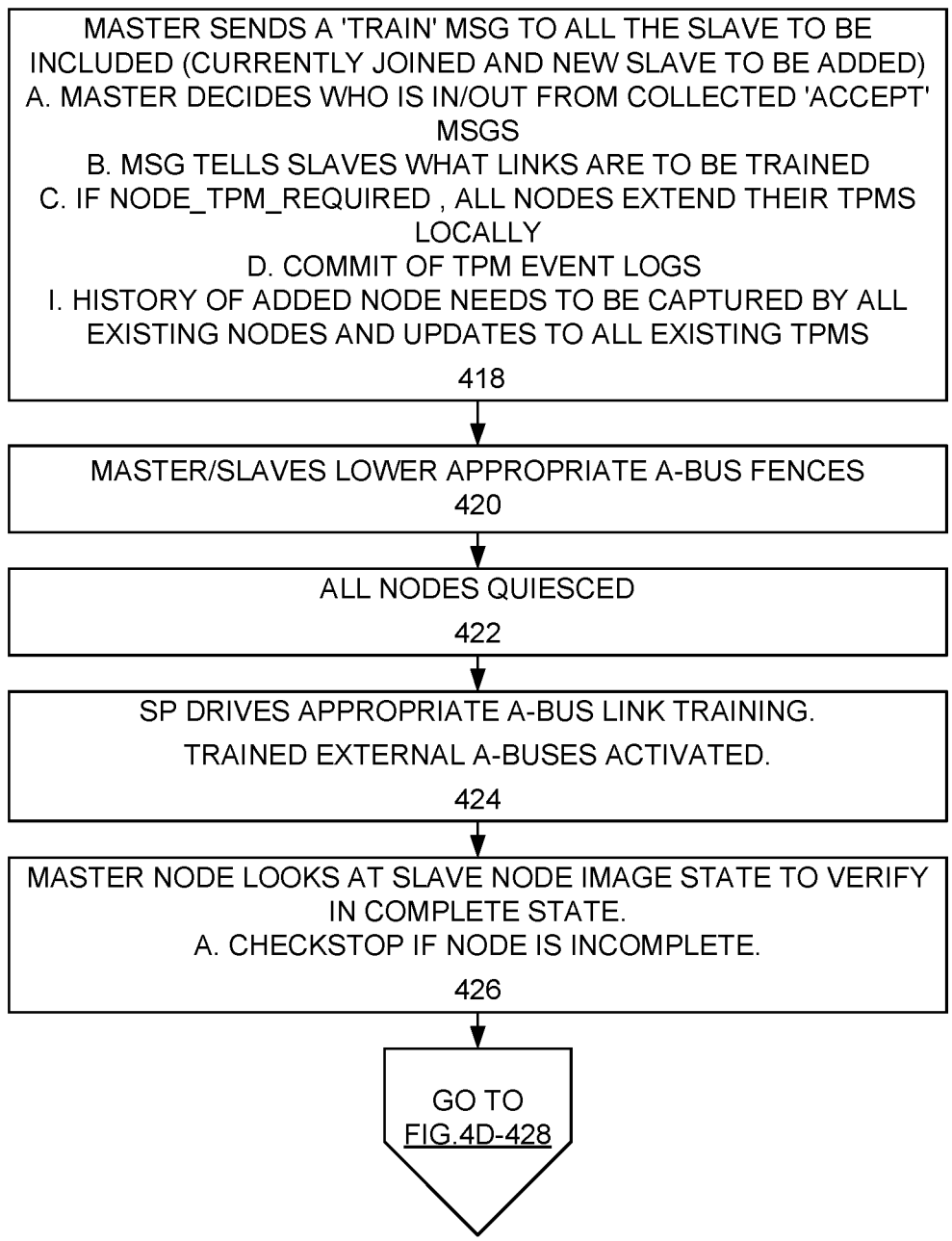

In FIG. 4C, as indicated at block 418, master sends a 'train' message to all the slaves to be included (currently joined and new slave to be added) and a. master decides who is in/out from collected accept messages; b. message tells slaves what links are to be trained; c. if node_TPM_required, all nodes extend their TPMs locally; and d. commit of TPM event logs; then i. history of added node is captured by all existing nodes and updates to all existing TPMs. As indicated at block 420, master and slaves lower appropriate A-bus fences. As indicated at block 422, all nodes quiesced. As indicated at block 424, service processor drives appropriate A-bus link training, the trained external A-buses activated. As indicated at block 426, master node looks at slave node image state to verify in complete state and a. checkstop if node is incomplete. Operations continue at a block 428 in FIG. 4D.

Figure 4D:
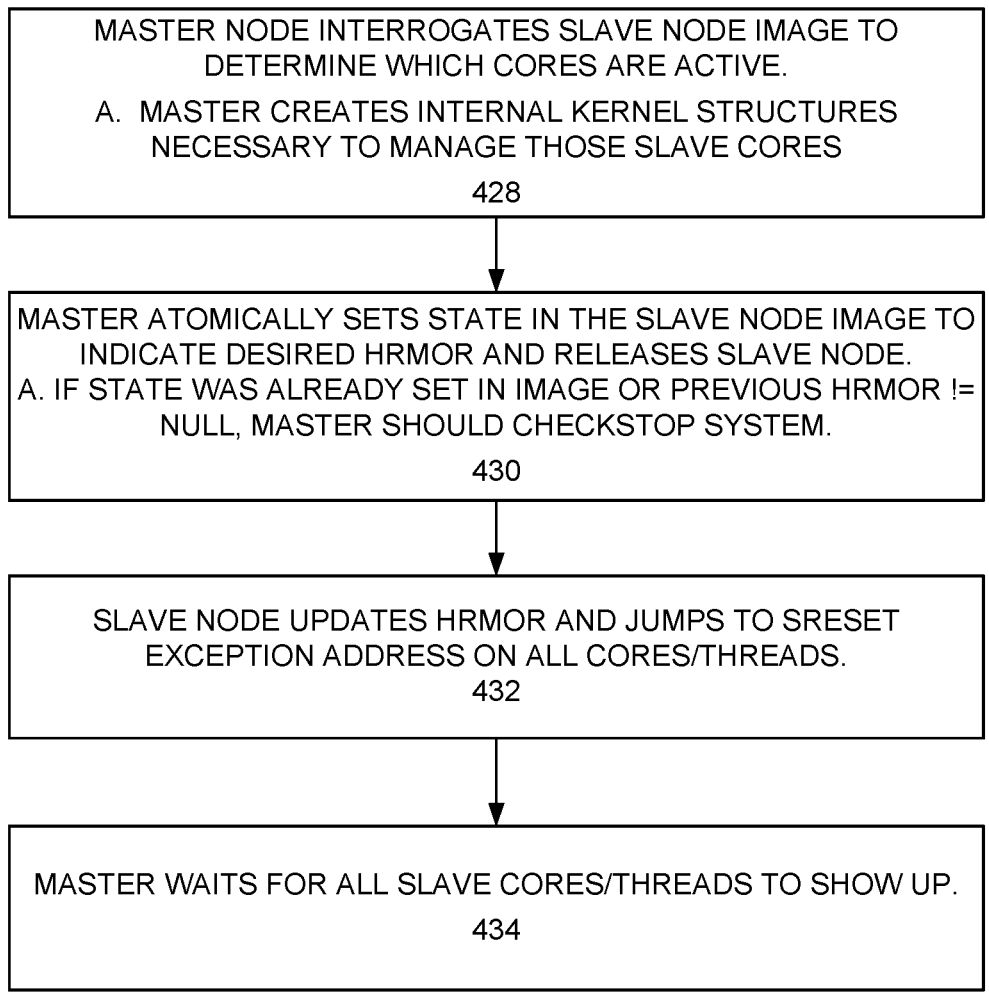

In FIG. 4D, as indicated at block 428 master node interrogates slave node image to determine which cores are active; and a. master creates internal kernel structures necessary to manage those slave cores. As indicated at block 430, master atomically sets state in the slave node image to indicate desired HRMOR and releases slave node and a. if state was already set in image or previous HRMOR !=null, master should checkstop system. As indicated at block 432, slave node updates HRMOR and jumps to SRESET exception address on all cores and threads. As indicated at block 434, master waits for all slave cores and threads to show up.

Figure 5:
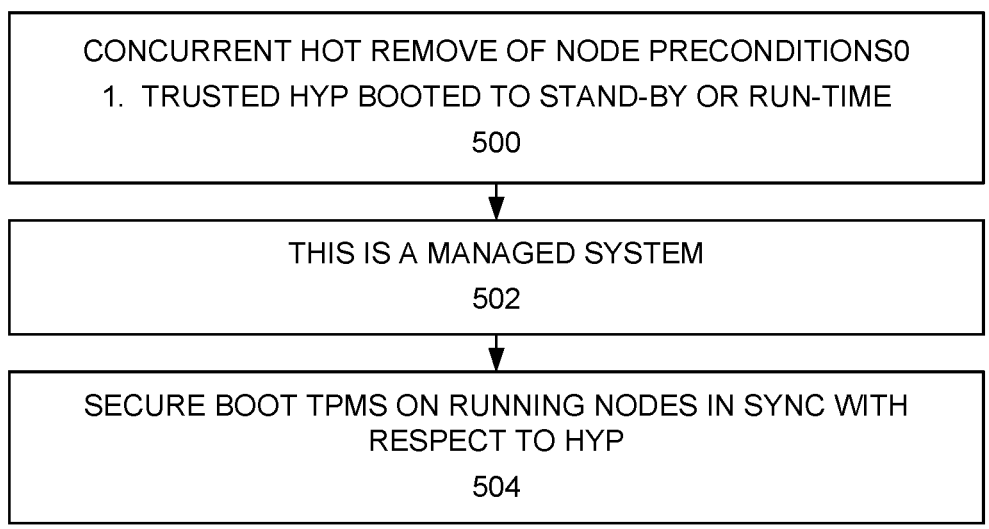
Figure 6:
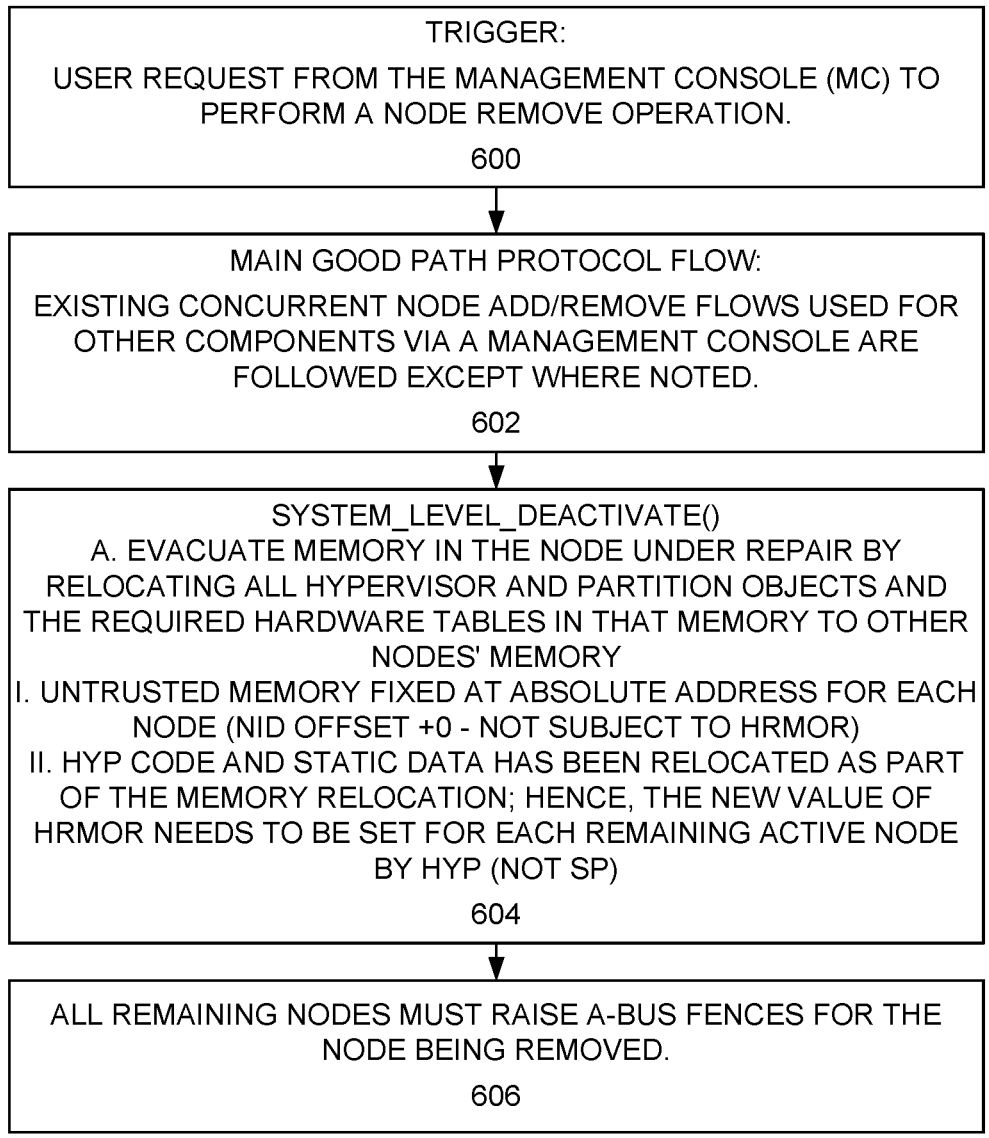

Referring now to FIGS. 5 and 6, there are shown example operations of an example method to support concurrent node add and remove in accordance with preferred embodiments. In FIG. 5, as shown starting at a block 500, concurrent hot remove of a node preconditions: 1. trusted HYP booted to stand-by or run-time. Further as shown at a block 502, this is a managed system. Further as shown at a block 504, secure boot TPMs on running nodes in sync with respect to HYP.

In FIG. 6, as shown starting at a block 600, trigger: user request from the management console (MC) to perform a node remove operation. As shown at a block 602, main good path protocol flow: existing CHARM flows used for other components via a management console are followed except where noted. As shown at a block 604, System_level_deactivate( ) include a. evacuate memory in the node under repair by relocating all hypervisor and partition objects and the required hardware tables in that memory to other nodes' memory; i. untrusted memory fixed at absolute address for each node (nid offset+0—not subject to HRMOR); and ii. HYP code and static data has been relocated as part of the memory relocation, hence, the new value of HRMOR needs to be set for each remaining active node by HYP (not service processor). As shown at a block 606, all remaining nodes must raise A-bus fences for the node being removed.

Figure 7:
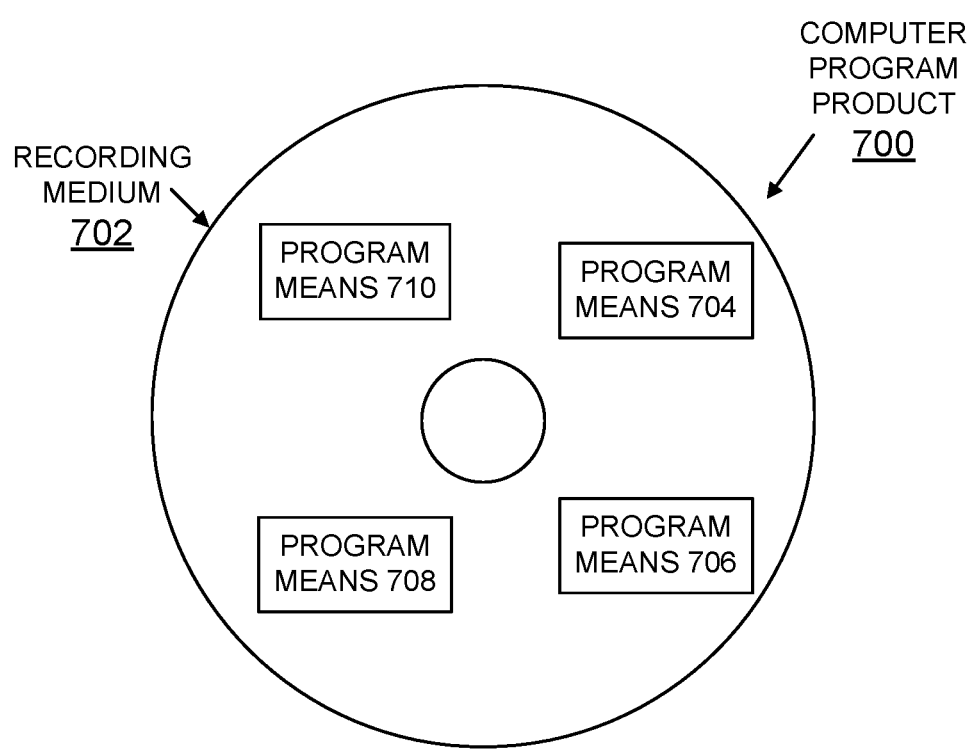
FIG. 7 is a block diagram illustrating a computer program product in accordance with the preferred embodiment.

Referring now to FIG. 7, an article of manufacture or a computer program product 700 of the invention is illustrated. The computer program product 700 is tangibly embodied on a non-transitory computer readable storage medium that includes a non-transitory recording medium 702, such as, a hard drive, a floppy disk, a high capacity read only memory in the form of an optically read compact disk or CD-ROM, a tape, or another similar computer program product. Recording medium 702 stores program means 704, 706, 708, and 710 on the medium 702 for carrying out the methods for implementing authentication protocol for merging multiple server nodes with trusted platform modules (TPMs) utilizing provisioned node certificates to support concurrent node add and node remove in computer system 100 of FIG. 1.

A sequence of program instructions or a logical assembly of one or more interrelated modules defined by the recorded program means 704, 706, 708, and 710, direct the computer system 100 for implementing authentication protocol for merging multiple server nodes with trusted platform modules (TPMs) utilizing provisioned node certificates to support concurrent node add and node remove.

While the present invention has been described with reference to the details of the embodiments of the invention shown in the drawing, these details are not intended to limit the scope of the invention as claimed in the appended claims.

What is claimed is:

1. A computer-implemented method for implementing authentication protocol for merging multiple server nodes with trusted platform modules (TPMs) utilizing provisioned node certificates, said computer-implemented method comprising:

booting an instance of enablement level firmware and extending said instance to a trusted platform module (TPM) on each server node when the server nodes are powered up;

establishing a hardware secure channel between the server nodes for firmware message passing as part of physical configuration of the multiple server nodes to be merged;

securely exchanging a shared secret via the hardware secure channel between the server nodes for establishing an initial authentication value shared among all nodes; and confirming common security configuration settings and exchanging TPM log and platform configuration register (PCR) data between all server nodes to establish common history for future attestation requirements, enabling dynamic changing the server nodes and concurrently adding and removing nodes, without requiring a system initial program load (IPL).

2. The computer-implemented method as recited in claim 1, comprises providing a master server node, and wherein enabling dynamic changing the server nodes and concurrently adding and removing nodes, without requiring a system initial program load (IPL) comprises removing said master server node after failing, and replacing said failed master server node with another server node.

3. The computer-implemented method as recited in claim 1, comprises providing a master server node, and providing slave nodes for other ones of the multiple server nodes; and providing each slave node with said common history for future attestation requirements.

4. The computer-implemented method as recited in claim 1, wherein establishing a hardware secure channel between the server nodes comprises providing said hardware secure channel having a low bandwidth of sufficient bandwidth for exchanging said shared secret between the server nodes.

5. The computer-implemented method as recited in claim 1, wherein establishing a hardware secure channel between the server nodes comprises providing said hardware secure channel having sufficient bandwidth for exchanging all protocol messages between the server nodes.

6. The computer-implemented method as recited in claim 1, comprises providing a service processor open channel for send additional protocol messages after the multiple server nodes boot, said service processor open channel is not trusted to a same level of trust as said hardware secure channel.

7. The computer-implemented method as recited in claim 1, comprises using the authentication protocol with multiple TPMs per server node of the multiple server nodes.

8. The computer-implemented method as recited in claim 1, comprises continuing operation without power off after dynamically changing the server nodes, including concurrently adding and removing nodes.

9. The computer-implemented method as recited in claim 1, comprises providing a master server node, and providing slave nodes for other ones of the multiple server nodes; and said master server node transmits said shared secret via said hardware secure channel to each slave node.

10. A computer system for implementing authentication protocol for merging multiple server nodes with trusted platform modules (TPMs) utilizing provisioned node certificates, said computer system comprising:

a central processing unit using an authentication protocol control to implement concurrent node add and node remove;

an instance of enablement level firmware booted and extended to a trusted platform module (TPM) on each server node when the server nodes are powered up;

a hardware secure channel established between the server nodes for firmware message passing as part of physical configuration of the server nodes to be merged;

a shared secret securely exchanged via the hardware secure channel between the server nodes for establishing an initial authentication value shared among all server nodes; and common security configuration settings, TPM log and platform configuration register (PCR) data confirmed and exchanged between all server nodes to establish common history for future attestation requirements, enabling dynamic changing the server nodes and concurrently adding and removing nodes, without requiring a system initial program load (IPL).

11. The system as recited in claim 10, includes control code stored on a computer readable medium, and wherein said central processing unit uses the control code for implementing authentication protocol for merging multiple server nodes with trusted platform modules (TPMs), and supporting concurrently adding and removing nodes.

12. The system as recited in claim 10, wherein said hardware secure channel established between the server nodes for firmware message passing as part of physical configuration of the server nodes to be merged comprises a low bandwidth hardware secure channel having sufficient bandwidth for exchanging said shared secret.

13. The system as recited in claim 10, wherein said hardware secure channel has sufficient bandwidth to handle all protocol messages as trusted including said common security configuration settings, TPM log and platform configuration register (PCR) data confirmed and exchanged between all server nodes.

14. The system as recited in claim 10, comprises a master server node, and slave server nodes for other ones of the multiple server nodes; and said master server node transmits said shared secret via said hardware secure channel to each slave node.

15. The system as recited in claim 10, comprises a service processor configuring the multiple server nodes, and selecting a master server node.

16. The system as recited in claim 10, comprises a service processor open channel for sending additional protocol messages after the multiple server nodes boot, said service processor open channel not trusted to a same level of trust as said hardware secure channel.

17. The system as recited in claim 10, comprises a service processor enabling dynamic changing the server nodes and concurrently adding and removing nodes.

18. The system as recited in claim 10, comprises a hypervisor, and wherein removing a server node comprises said hypervisor relocating memory objects for other server nodes.

19. The system as recited in claim 10, comprises multiple trusted platform modules (TPMs) on each server node.

20. The system as recited in claim 10, comprises a type II hypervisor residing on a host operating system.

\* \* \* \* \*